United States Patent [19]

Lewis

[11] Patent Number: 6,145,068

[45] Date of Patent: Nov. 7, 2000

[54] DATA TRANSFER TO A NON-VOLATILE STORAGE MEDIUM

[75] Inventor: Timothy Lewis, Fremont, Calif.

[73] Assignee: Phoenix Technologies Ltd., San Jose, Calif.

[21] Appl. No.: 08/931,330

[22] Filed: Sep. 16, 1997

[51] Int. Cl.[7] .............................. H03M 7/00; H03M 7/30; G06F 12/00

[52] U.S. Cl. ......................... 711/170; 711/161; 711/173; 341/50; 341/55

[58] Field of Search ............................... 704/504; 341/59, 341/50, 55; 358/261.1, 426; 375/250; 711/100, 161, 170, 173; 714/15, 18, 22; 710/68

[56] References Cited

U.S. PATENT DOCUMENTS

| | | | |
|---|---|---|---|
| 2,922,840 | 1/1960 | Lally | 358/426 |
| 3,588,329 | 6/1971 | Monk | 358/426 |
| 3,656,178 | 4/1972 | De Maine et al. | 444/1 |

(List continued on next page.)

FOREIGN PATENT DOCUMENTS

| | | |
|---|---|---|
| 636 978 | 2/1995 | European Pat. Off. . |
| 658 843 | 6/1995 | European Pat. Off. . |
| WO 97/08608 | 6/1997 | WIPO ............................... G06F 7/00 |

OTHER PUBLICATIONS

"Hybernating and Resuming a Compressed Memory Image", IBM Technical Disclosure Bulletin, vol. 38, No. 8, Aug. 1995, p. 73.

"Automatic Data Compression Control for Hibernation", IBM Technical Disclosure Bulletin, vol. 39, No. 4, Apr. 1996; pp. 185–186.

Wu, et al., Recoverable Distributed Shred Virtual Memory: Memory Coherence and Storage Structures, 19th International Symposium on Fault–Tolerant Computing, IEEE Computer Society, Press, 1989, pp. 520–527.

Brookstein, et al., Flexible Compression for Bitmap Sets, DCC'91 Data Compression Conference, Los Alamitos, CA, IEEE Computer Society Press, 1991, pp. 402–410.

(List continued on next page.)

*Primary Examiner*—Eddie P. Chan
*Assistant Examiner*—Yamir Encarnación
*Attorney, Agent, or Firm*—Foley & Lardner

[57] ABSTRACT

To improve the speed of transition to the zero-volt suspend state, system context is saved from volatile random access memory to non-volatile memory, such as a hard disk, using a compression algorithm which speeds the transfer of data to non-volatile memory by recognizing data pages having bytes of a single value. The system context in extended memory of RAM consists of a number of system context memory blocks, and between these memory blocks are memory holes containing information which does not require storage. Initially, the entirety of data in a buffer region of RAM is stored directly to disk. Then, successive pages from each system context memory block are transferred to the buffer, where the page size corresponds to the memory management unit page size. When testing locates a region of heterogeneous entries, then a heterogeneous-data flag, the length of the heterogeneous region, and the heterogeneous data region are transferred to the buffer. When testing determines that a page contains bytes of a single value, then a compression flag representing that value is substituted for that page. When a memory hole is reached, a memory hole flag and the size of the memory hole are transferred to the buffer. On each transfer of a byte of data to the buffer it is determined whether the buffer is full, and when it is full then a write-to-disk is performed. To transition from the zero-volt suspend state back to an operational state, bytes are transferred from the hard disk to the buffer whenever all the bytes currently in the buffer have been transferred to extended memory. When testing of the buffer entries locates a heterogeneous-data flag, the value immediately following the flag is determined, and a data region having a length of that value is transferred to extended memory. When a compression flag is found, a 4 kilobyte page of the corresponding byte value is transferred to extended memory. When a memory hole flag is found, a memory hole with a length of the value immediately following the memory hole flag is created in extended memory.

37 Claims, 10 Drawing Sheets

U.S. PATENT DOCUMENTS

| | | | |
|---|---|---|---|
| 4,366,505 | 12/1982 | Tsuda et al. | 358/426 |
| 4,543,611 | 9/1985 | Kurahayashi | 358/426 |
| 4,682,241 | 7/1987 | Adachi | 358/261.1 |
| 5,291,600 | 3/1994 | Lutz et al. | 395/700 |
| 5,408,542 | 4/1995 | Callahan | 358/261.1 |
| 5,448,719 | 9/1995 | Schultz et al. | 395/182 |
| 5,459,850 | 10/1995 | Clay et al. | 395/497 |
| 5,481,701 | 1/1996 | Chambers, IV | 395/600 |
| 5,511,202 | 4/1996 | Combs et al. | 395/750 |
| 5,530,877 | 6/1996 | Hanaoka | 395/750 |
| 5,548,763 | 8/1996 | Combs et al. | 395/750 |
| 5,551,043 | 8/1996 | Crump et al. | 395/750 |
| 5,553,238 | 9/1996 | Nelson | 395/185 |
| 5,559,978 | 9/1996 | Spilo | 395/413 |
| 5,560,023 | 9/1996 | Crump et al. | 395/750 |
| 5,563,920 | 10/1996 | Fimoff et al. | 375/354 |
| 5,564,037 | 10/1996 | Lam | 707/204 |
| 5,574,906 | 11/1996 | Morris | 395/601 |
| 5,577,248 | 11/1996 | Chambers, IV | 395/601 |
| 5,588,069 | 12/1996 | Katayama et al. | 382/162 |
| 5,603,038 | 2/1997 | Crump et al. | 395/750 |
| 5,604,889 | 2/1997 | Pickens et al. | 395/500 |
| 5,617,532 | 4/1997 | Ushiyama | 395/183 |
| 5,617,552 | 4/1997 | Garber et al. | 395/401 |
| 5,720,029 | 2/1998 | Kern et al. | 714/20 |
| 5,861,959 | 1/1999 | Barak | 358/403 |

OTHER PUBLICATIONS

Douglis, Fred, The Compression Cache: Using On–line Compression to Extend Physical Memory, 1993 Winter USENIX–January 25–29, 1993, San Diego, CA, pp. 519–529.

Hauser, Speeding Up UNIX Login by Caching the Initial Environment, 1994 LISA–Sep. 19–23, 1994, San Diego, CA, pp. 117–124.

Kambayashi, et al., Data compression procedures utilizing the similarity of data, AFIPS 1981 National Computer Conference, May 4–7, 1981, Chicago, IL, pp. 555–562.

Kjelso, et al., Memory Management in Flash–Memory Disks with Data Compression, Memory Management International Workshop IWMM 95, Sep. 27–29, 1995 Kinross, UK., pp. 399–413.

Taunton, Compressed Executables: an Exercise in Small Thinking, USENIX–Summer 1991, Nashville, TN, pp. 385–402.

Wang, et al., Vector Run–length Coding of Bi–level Images, DCC'92 Data Compression Conference, Los Alamitos, CA, IEEE Computer Society Press, 1992, pp. 289–298.

Williams, An Extremely Fast ZIV–Lempel Data Compression Algorithm, DCC'91 Data Compression Conference, Los Alamitos, CA, IEEE Computer Society Press, 1991, pp. 362–371.

Wolfe, et al., Executing Compressed Programs on an Embedded RISC Architecture, $25^{th}$ Annual International Symposium on Microarchitecture MICRO, Dec. 1–4, 1992, Portland, OR, 1992, pp. 81–91.

DATA TRANSFER TO A NON-VOLATILE STORAGE MEDIUM

BACKGROUND OF THE INVENTION

The present invention is directed to apparatus and method for transferring data stored in a volatile storage medium (e.g., random access memory) to a non-volatile storage medium (e.g., a hard drive), particularly to allow transition to a zero-volt suspend state. The present invention is also directed to the restoring of such data to the volatile storage medium, particularly when power is resumed. More particularly, the present invention is directed to such apparatus and method where data compression is used to increase the speed of the data transfers.

An advanced power management standard, termed the "Advanced Configuration Power Interface" (ACPI), has been proposed by Intel Corporation of Santa Clara, Calif., Microsoft Corporation of Redmond, Wash., and Toshiba Corporation of Tokyo, Japan. According to the ACPI specification, the operating system rather than the basic input/output system (BIOS) controls power management, thermal states, and plug-and-play (wherein enumeration and configuration of motherboard devices is performed by the operating system) functionality of the computer. This allows the operating system to evolve independently from the hardware, so that ACPI-compatible computers can gain the benefits of improvements and innovations in the operating system. Furthermore, this allows the hardware to evolve independently from the operating system, thereby decoupling hardware and operating system ship cycles.

The ACPI specification describes a range of global system states between the OFF state and the fully ON state. The global system states apply to the entire system, and the state of the system at any instant is apparent to the user. The ACPI specification also describes a range of device power states between the OFF state and the fully ON state; these states are generally not apparent to the user. For instance, to save power a laptop computer may allow the hard drive to go into a "sleep" state where the disc of the hard drive is not spinning. When in this "spin-down" state, the hard drive is still available to the operating system. However, access to data on the hard drive is not as rapid, since the disc of the hard drive must be "spun up" to its full rotation speed before data on the drive can be accessed. So, although the functionality of the hard drive is reduced, the power consumption can be greatly reduced.

According to the ACPI specification, the system sleep levels are labeled as S0, S1, S2, S3, S4 and S5, with S5 having the lowest power consumption and the lowest functionality, and S0 being a fully operational state with the greatest power consumption. The S5 state is termed the "soft off" state. In transition to the S5 state, no context is saved by the operating system or the hardware. When the S5 state is initiated, the hardware will sequence the system to a state that is similar to the traditional "off" state. The hardware has no responsibility for maintaining any system context, however, it does allow for a wake-up to be initiated by pressing the power button, whereupon the BIOS does a normal power-on reset.

State S4, termed the "zero-volt suspend" state, differs from S5 only in that in transition to the S4 state the operating system (S4/OS) or BIOS (S4/BIOS)is responsible for saving all system context (i.e., the status of various system devices, BIOS information, information regarding what applications are open and what data files have been modified but not saved, etc.) by saving the data stored in RAM to non-volatile storage. In the zero-volt suspend state the machine draws almost zero power and retains system context for an arbitrary period of time, years or decades if needed. Upon awakening from the zero-volt suspend state, the operating system restores the system to the state that it was in just prior to entering the zero-volt suspend state.

However, in the S4 state the system hardware context is lost—the hardware will sequence the system to a state that is similar to the S5 state, but has no responsibility for maintaining any system context. The hardware does allow the enabling of certain wake-up events, and upon waking up, the BIOS does a normal power-on reset.

Unfortunately, the amount of time required to transfer the system context information directly between RAM and the hard drive for user requested transitions to and from the S4 zero-volt suspend state tends to be long from the user's perspective, making the system appear sluggish. Furthermore, the transition time to the S4 zero-volt suspend state is even more critical when there is an unexpected power loss or shut down, such as when: the battery runs low or is accidentally removed on a laptop computer; a computer reaches its critical thermal limit and must be shut down to prevent damage; or, there is power loss to the UPS (uninterruptible power supply) of a server, in which case there is generally about five minutes of back-up power available.

Scanning for 64 kilobyte blocks of zeroes and substituting a signature word representing each zero block (thereby effecting a compression) is known in the art as a way of speeding these data transfers. However, the processing time required to perform more sophisticated compression schemes has been considered to be prohibitive. Of issue in any method used to increase the speed of the transition to the zero-volt suspend state is the robustness of the method in view of variations in the types of data in RAM that need to be stored—given that the time available to perform a zero-volt suspend may be uncertain, the compression which is used must generally increase the speed of the data transfer, and in cases where the speed of the transfer is actually lengthened, the amount by which it is lengthened must be by a very small percentage.

Therefore, an object of the present invention is therefore to provide a method for speeding the transfer of data, particularly configuration data stored in volatile memory to non-volatile memory, and particularly for the purpose of preparing the system for a transition to a low-power suspend state.

Another object of the present invention is to provide a method for speeding the transfer of data which was previously saved from volatile memory to non-volatile memory, back to the volatile memory, particularly for the purpose of resuming operation after a transition from a low-power state to a normal operating state.

A further object of the present invention is to provide a method for increasing a data transfer rate by compressing data, particularly system context data, which generally provides an increase in the speed of the data transfer, and in cases where the speed of the transfer is lengthened, the amount by which it is lengthened must be small.

Still another object of the present invention is to provide a method for compressing segments of data of a variety of types and/or sizes.

Further objects and advantages of the present invention will become apparent from a consideration of the drawings and the ensuing detailed description.

SUMMARY OF THE INVENTION

The present invention is directed to a method for transferring data located in a memory block in a first computer memory to a non-volatile storage. A first page of the memory block is examined and if the page contains bytes of a single value, then a compression flag is set to a homogeneous-page value and transferred to a buffer in the first computer memory. However, if the page contains bytes having more than one value, the page is transferred to the buffer. When the buffer is full, the contents of the buffer are transferred to the non-volatile storage.

The present invention is also directed to a utility for transferring data located as contents in a memory block in a first computer memory to a non-volatile storage. The memory block has a beginning address and a first page. The utility includes means for setting a flag to a first homogeneous-page value if the first page of the memory block contains bytes solely of a first byte value or for setting the flag to a heterogeneous-page value if the first page of the memory block contains bytes of multiple values. Means is also included for transferring the flag to a buffer address in a buffer region in the first computer memory and incrementing the buffer address, if the flag has the first homogeneous-page value or for transferring at least the contents of the first page to the buffer address in the buffer region and serially incrementing the buffer address during the transfer, if the flag has the heterogeneous-page value. The utility also includes means for evaluating the buffer address after each of the incrementations of the buffer address and, if the buffer address is greater than or equal to a buffer ending address, transferring the contents of the buffer to the non-volatile storage and setting the buffer address equal to a beginning buffer address.

The present invention also provides a computer system with an operating system and/or BIOS. The operating system has predefined devices including a memory block having a beginning address and a first page in a first computer memory and a non-volatile storage. The system includes a device for transferring data located as contents in the memory block to a non-volatile storage. The device is configured to: set a flag to a first homogeneous-page value if the first page of the memory block contains bytes solely of a first byte value or for setting the flag to a heterogeneous-page value if the first page of the memory block contains bytes of multiple values; transfer the flag to a buffer address in a buffer region in the first computer memory and incrementing the buffer address, if the flag has the first homogeneous-page value or transfer at least the contents of the first page to the buffer address in the buffer region and serially increment the buffer address during the transfer, if the flag has the heterogeneous-page value; and evaluate the buffer address after each of the incrementations of the buffer address and, if the buffer address is greater than or equal to a buffer ending address, transfer the contents of the buffer to the non-volatile storage and set the buffer address equal to a beginning buffer address.

A computer-readable storage device is also provided by the present invention. The device includes a utility for transferring data located as contents in a memory block in a first computer memory to a non-volatile storage as described above. Preferably, the computer readable storage medium is a memory device, a microprocessor with integrated memory, a compact disc, or a floppy disk.

BRIEF DESCRIPTION OF THE DRAWINGS

The accompanying drawings, which are incorporated in and form a part of the present specification, illustrate embodiments of the invention and, together with the Detailed Description of the Invention, serve to explain the principles of the invention.

DETAILED DESCRIPTION OF THE INVENTION

Figure 1A:
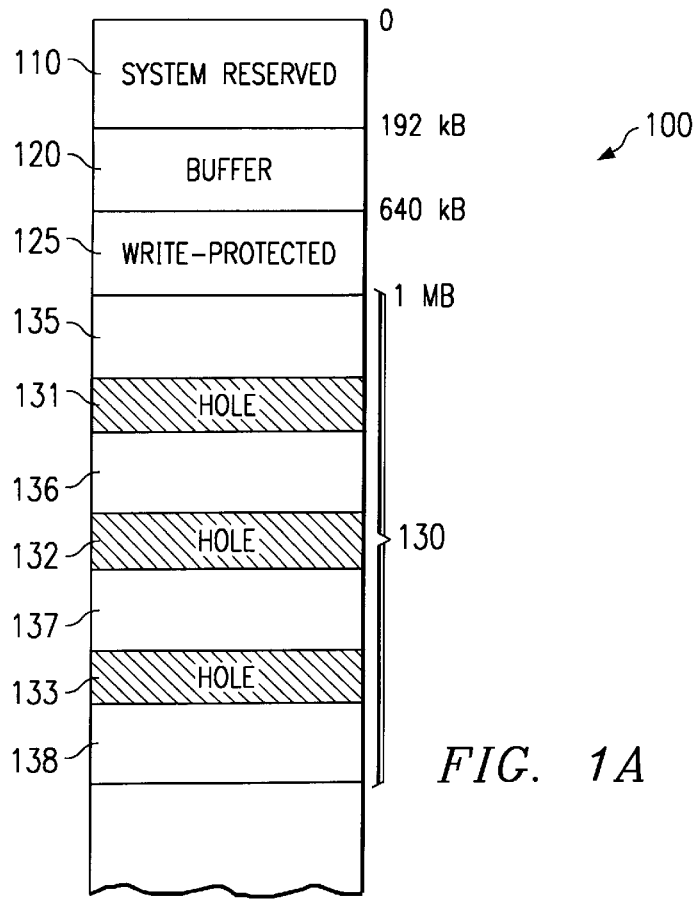
FIG. 1A is a schematic of the various section of RAM memory.

As shown in FIG. 1A, the random access memory (RAM) 100 of a typical IBMcompatible personal computer consists of system reserved area 110 from 0 to 192 kilobytes, a buffer region 120 from 192 to 640 kilobytes, a write-protected region 125 from 640 kilobytes to 1 megabyte, and an extended memory region 130 from 1 megabyte upwards which includes a number of memory blocks 135, 131, 136, 132, 137, 133 and 138. Generally, the extended memory region 130 consists of a number of memory holes 131, 132, 133 (three are shown in the exemplary depiction of FIG. 1A) separating the system data blocks 135, 136, 137 and 138. The memory holes 131–133 are reserved as buffers for the interior hardware or for control of external devices such as printers, modems, etc., and their contents need not be saved during the suspend save process.

The write-protected section 125 includes a section of shadow RAM which extends to the 1 megabyte boundary. During boot-up by the basic input/output system (BIOS), tables containing information, such as the locations of the memory holes 131–133, are stored in this region 125 of RAM 100 that is then write-protected to become the shadow RAM.

Figure 2:
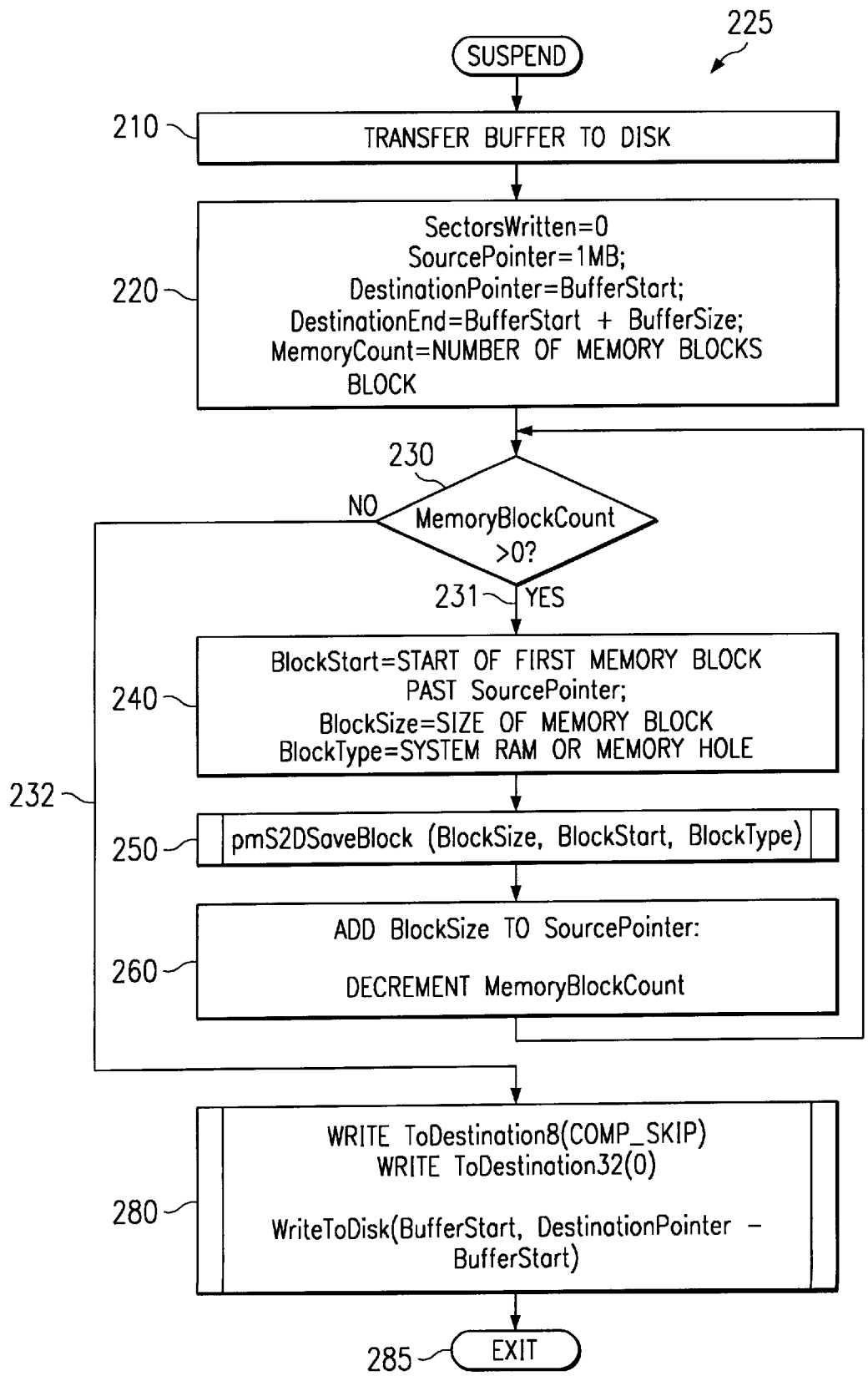
FIG. 2 shows a flowchart of the process of saving the data in RAM to disk for a zero-volt suspend.

A flowchart for the process of saving the contents of RAM memory to hard disk for a zero-volt suspend according to the present invention is shown in FIG. 2. The suspend flowchart begins with the step 210 of storing the contents of the buffer 120 directly to the hard drive, thereby clearing the buffer region 120 to be available for the compression and storage of the remainder of the information in RAM 100. (Actually, all the contents of RAM below IMB are transferred to disk, but for the purpose of the present invention only the buffer needs to be cleared.) Then, a number of variables are initialized 220 with table values from the shadow RAM. In particular: SectorsWritten is initialized to zero; Source-Pointer is initialized to the address of the beginning of the 1 MB+ extended memory region 130 (i.e., 1 MB); Destination Pointer is initialized to BufferStart, the address of the beginning of the buffer region 120; DestinationEnd is initialized to (BufferStart+BufferSize), the address of the end of the buffer region 120, since BufferSize is the size of the buffer region 120; MemoryBlockCount is initialized to the value of the number of memory blocks 135–138 in the 1 MB+ memory 130 (in the example of FIG. 2 there are four).

Figure 3:
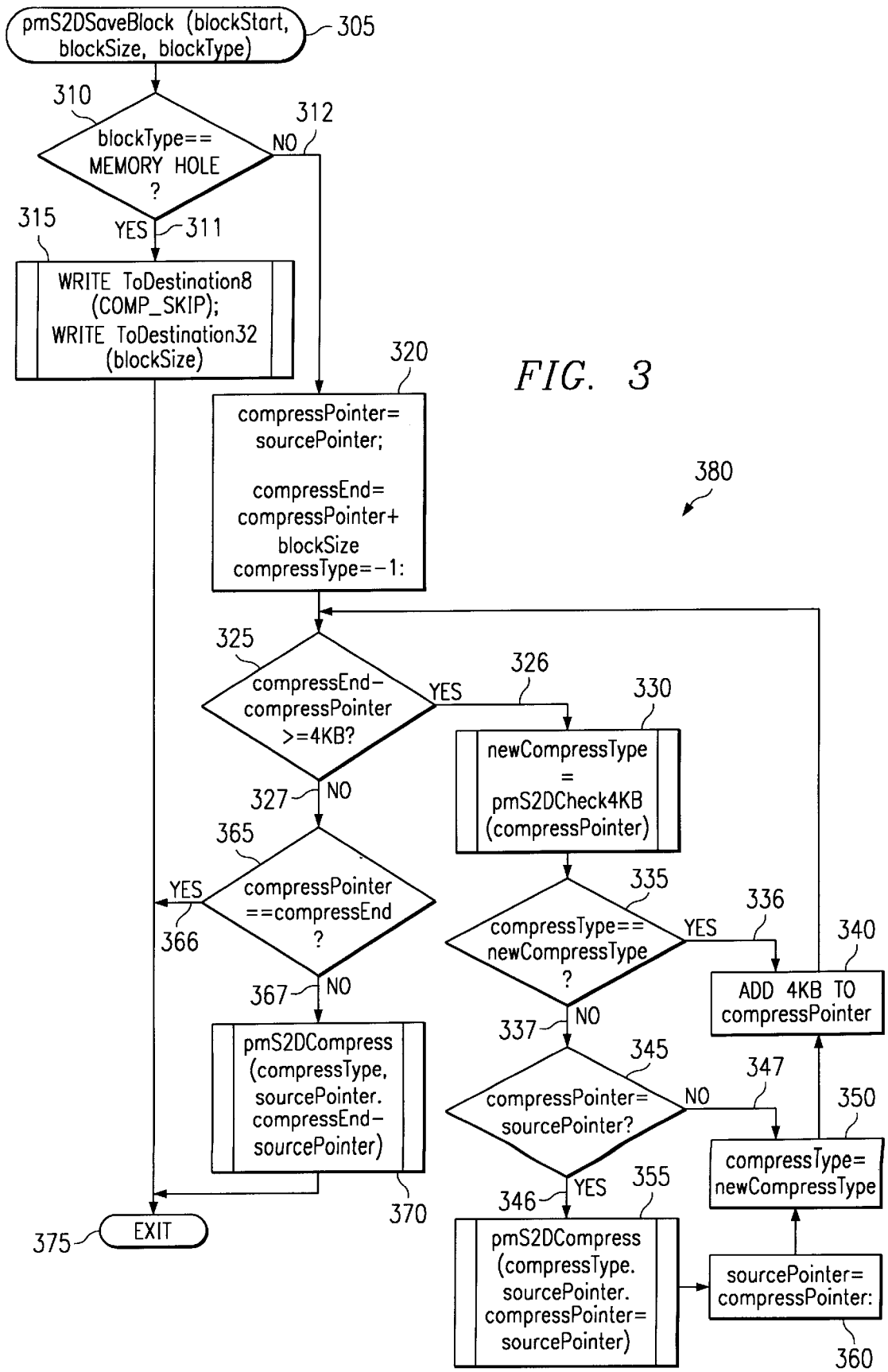
FIG. 3 shows a flowchart for the function pmS2DSaveBlock which tests pages to determine if they are single valued or heterogeneous system context data, and when consecutive single-value pages or consecutive heterogeneous pages are identified the are transferred to the buffer via pmS2Dcompress.

MemoryBlockCount is then tested 230 to determine whether it has a value greater than zero. If so 231, then further blocks of memory are to be stored, so BlockStart is set equal to the address of the first memory block past the current value of Source Pointer, BlockSize is set equal to the size of this memory block, and BlockType is given a value indicating whether the memory block contains system configuration data 135–138 or is a memory hole 131–133. On the initial pass through the loop 225 (consisting of steps 230, 240, 250 and 260) which begins with a test of the value of MemoryBlockCount 230, BlockStart has the starting address of the 1 MB+ region 130, and the BlockType has a value indicating that the current memory block, in this case the first memory block 135, is not a memory hole 131–133. The memory block 135 is then written to the buffer 120, and possibly compressed in the process, and saved to disk by the function pmS2DSaveBlock 250 ("pmS2D" stands for "power management save-to-disk"), which is passed the arguments BlockSize, BlockStart and BlockType. The flowchart for pmS2DSaveBlock is shown in FIG. 3, and described in detail below. (Double vertical borders around flowchart elements indicates that these elements are functions described by additional flowcharts.)

Once the current memory block is saved to disk by pmS2DSaveBlock 250, BlockSize is added to SourcePointer so that SourcePointer points to the beginning of the next memory block, and MemoryBlockCount is decremented by one 260. The value of MemoryBlockCount is then tested 230 again, and loop 225 is repeated if MemoryBlockCount is found to be greater than zero 231. Otherwise, if MemoryBlockCount is equal to zero 232, then all of the memory blocks have been saved to disk. Then 280, the compression flag "COMP_SKIP" (an 8-bit value) and four bytes (i.e., 32 bits) of zeroes are written to disk by the functions WriteToDestination8 and WriteToDestination32, respectively, and the function WriteToDisk writes to disk the contents of the buffer 120, where the argument BufferStart is the address of the beginning of the buffer 120, and the argument (DestinationPointer-BufferStart) is the length of the data in the buffer. The four byte value following the flag COMP_SKIP represents the length of a memory hole 131–133 which has been skipped in the save-to-disk process, so the value of zero marks the end of the data saved from RAM 100, and the suspend process is exited 285. (The functions WriteToDestination8, WriteToDestination32 and WriteToDisk are flowcharted in FIGS. 4, 5 and 6, respectively, and discussed in detail below.)

The flowchart for the function pmS2DSaveBlock is shown in FIG. 3. When pmS2DSaveBlock is called, it is first determined 310 whether the BlockType is a memory hole 131–133. Memory holes 131–133 contain hardware context or buffers for peripherals and are not saved to disk, so if it is 311 a memory hole 131–133, the memory hole flag "COMP_SKIP" and the size of the hole, BlockSize, are written to disk 315 by the functions WriteToDestination8 and WriteToDestination32, respectively, and the function pmS2DSaveBlock is exited 375.

Figure 7:
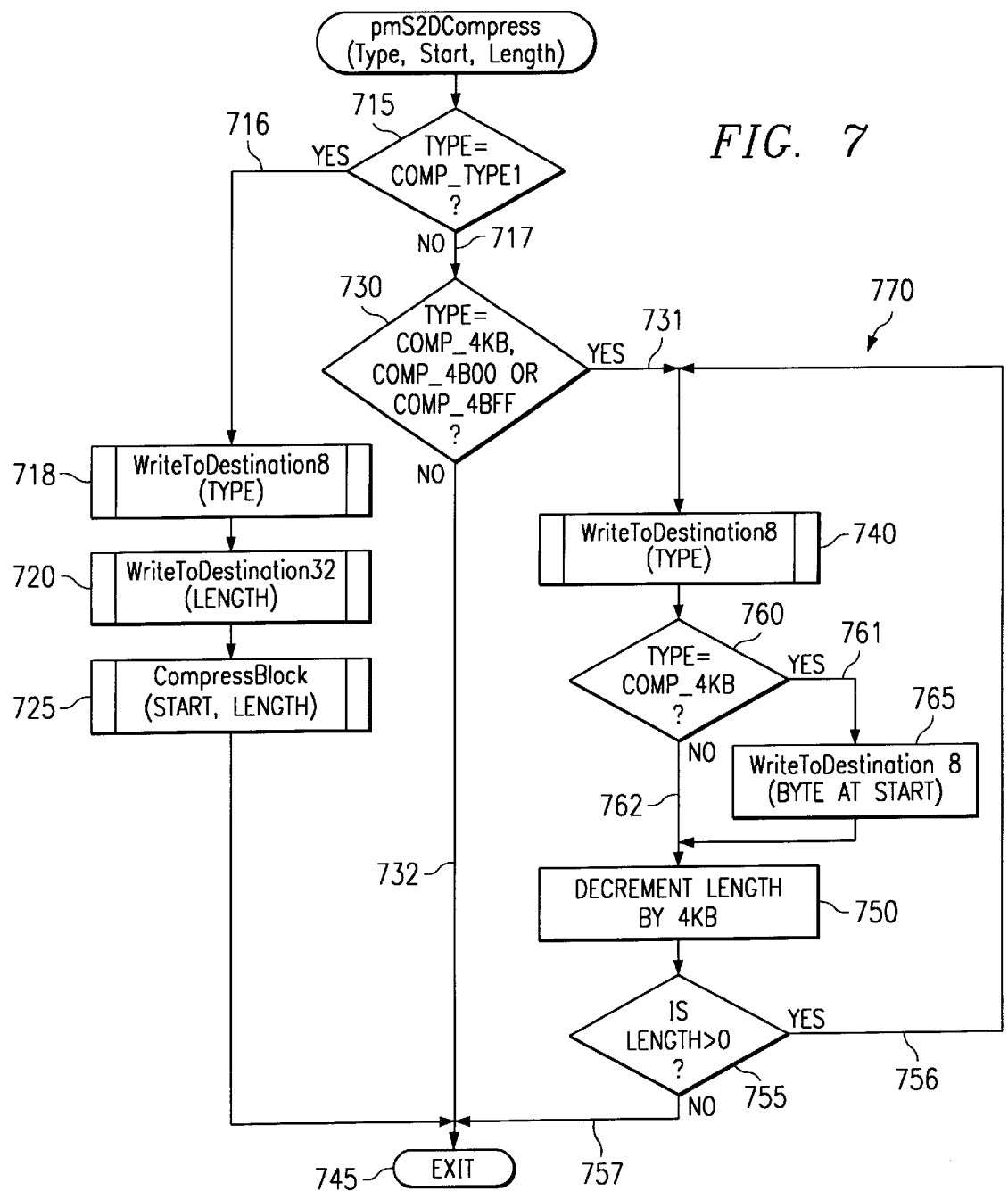
FIG. 7 shows a flowchart for pmS2DCompress, a function which transfers compressed data to the buffer once the type of data has been identified.

Otherwise, the block is not 312 a memory hole 131–133, and so it must be saved to disk. CompressPointer is set equal to SourcePointer, CompressEnd is set equal to (CompressPointer+BlockSize), i.e., the address of the end of the block to saved, and CompressType is initialized to a preliminary value of negative unity to indicate that no iterations of loop 380 (consisting of steps 325, 330, 335, 340, 345, 350, 355 and 360) of the flowchart of FIG. 3 have been performed. It is then determined 325 if the difference between CompressEnd and CompressPointer is greater than the length of a memory management unit page. (For ease of presentation, the present invention will be described in terms of 80386, 80486 and Pentium processors which have memory management unit page lengths of 4 kilobytes.) If it is not 326, then no pages or only a single page remains in that memory block. It is then determined 365 whether CompressPointer is equal to CompressEnd, and if CompressPointer does equal CompressEnd 366, then no RAM data remains to be saved and pmS2DSaveBlock is exited 375. If CompressPointer does not equal CompressEnd 367, then the function pmS2DCompress is called 370 a final time (pmS2DCompress has generally already been repeated called at step 355 in loop 380). The flowchart for pmS2DCompress is shown in FIG. 7, and described in detail below.

Figure 8:
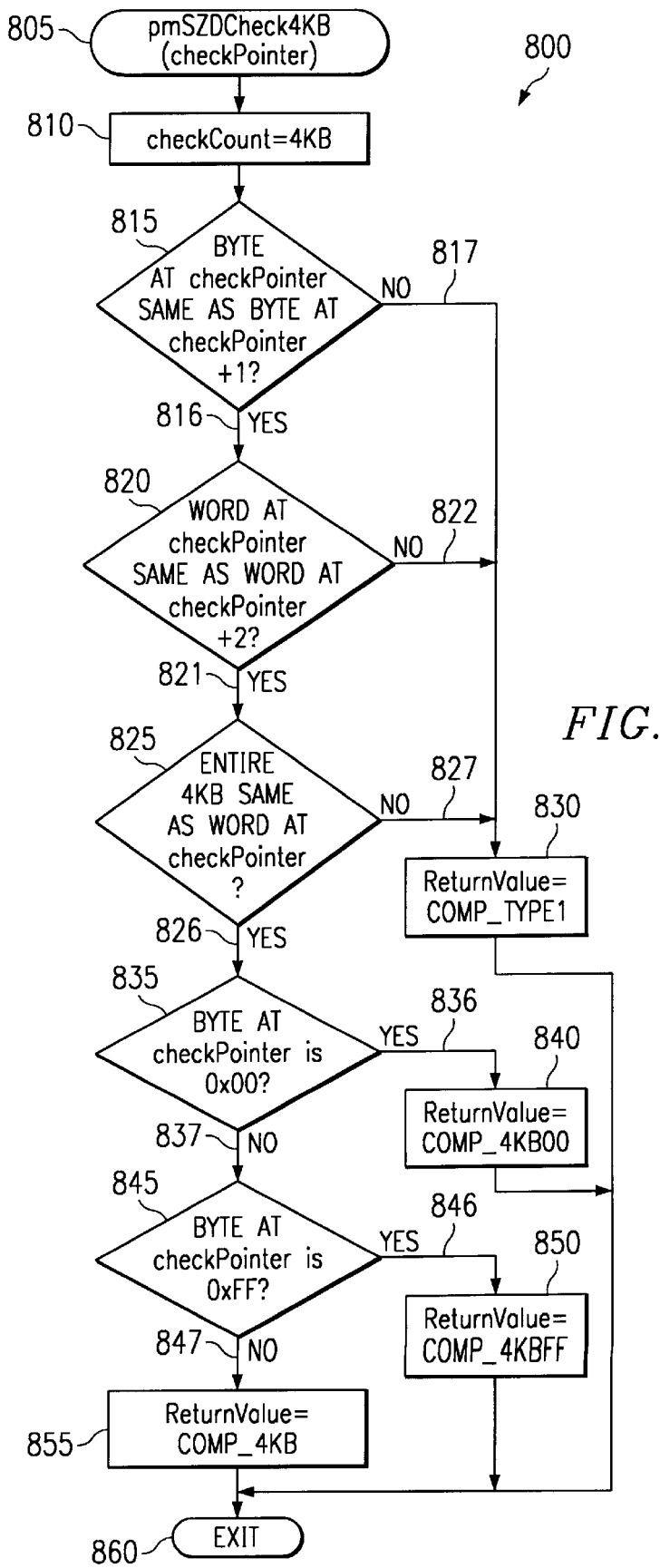
FIG. 8 shows a flowchart for pmS2DCheck4KB, a function which determines if a page has bytes of a single value.

If, when the difference between CompressEnd and CompressPointer is compared to 4 kilobytes 325, it is determined that the difference is greater than or equal to 4 kilobytes 326, then the function pmS2DCheck4KB is called 330 with the argument CompressPointer, and newCompressType is set equal to the value returned by pmS2DCheck4KB. The flowchart for pmS2DCheck4KB is shown in FIG. 8, and described in detail below. Briefly, if the bytes in the page beginning at CompressPointer do not have the same value, then pmS2DCheck4KB returns the heterogeneous data flag COMP_TYPE1. Otherwise, if the bytes in the page are zeroes or 0xFF's, then pmS2DCheck4KB returns the compression flag values COMP_4KB00 or COMP_4KBFF, respectively; and if the bytes in the 4 kilobyte sector all have the same value but are not zeroes or 0xFF's, then pmS2DCheck4KB returns the general-value compression flag value COMP_4KB.

After the call 330 to pmS2DCheck4KB, CompressType is compared 335 with newCompressType, to determine if the current page has the same values as the previous page. If CompressType and newCompressType are equal 336, then 4 kilobytes is added to CompressPointer 340, and the loop 380 beginning at the comparison 325 of the difference (CompressEnd-CompressPointer) with 4 kilobytes is begun again. However, if CompressType and newCompressType are not equal 337, then the values of CompressPointer and SourcePointer are compared 345 to determine whether CompressPointer is greater than SourcePointer. If not 347, CompressType is set equal to newCompressType 350 and 4 kilobytes is added to CompressPointer 340, and the loop 380 beginning at the comparison 325 of the difference (CompressEnd-CompressPointer) with 4 kilobytes is begun again.

However, if CompressPointer is not equal to Source-Pointer 346, then the function pmS2DCompress is called 355 with the arguments CompressType, SourcePointer and the difference (CompressPointer-SourcePointer). Then, SourcePointer is set equal to CompressPointer 360, CompressType is set equal to newCompressType 350 and 4 kilobytes is added to CompressPointer 340, and the loop 380 beginning at the comparison 325 of the difference (CompressEnd-CompressPointer) with 4 kilobytes is begun again.

Figure 1B:
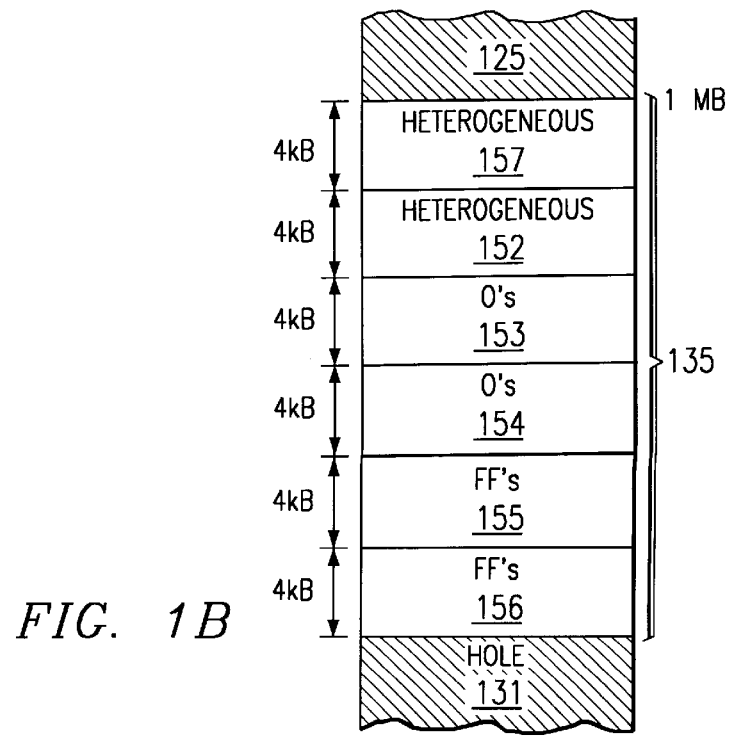
FIG. 1B depicts an exemplary section of extended memory.

To illustrate the operation of the flowchart of FIG. 3, an exemplary composition of an initial system context memory block 135 is shown in FIG. 1B. In this exemplary block 135, which begins at the 1 MB+ boundary and extends to memory hole 131, there is a first 4 kB page of heterogeneous system context data 151, a second 4 kB page of heterogeneous system context data 152, a first single-value 4 kB page of zeroes 153, a second single-value 4 kB page of zeroes 154, a first single-value 4 kB page of 0xFF's 155, and a second single-value 4 kB page of 0xFF's 156.

For this initial system context memory block 135, pmS2DSaveBlock is called with BlockStart equal to the 1 MB address, BlockSize equal to 24 kilobytes, and Block-Type having a value indicating that this section 135 is not a memory hole 131–133. It is then determined 310 that the block 135 is not 312 a memory hole 131–133. Control passes to step 320 where CompressPointer is set equal to SourcePointer, which still has a value of 1 MB, CompressEnd is set equal to (CompressPointer+BlockSize), i.e., 1024 kB, and CompressType is given the preliminary value of negative unity. Then 325, since (CompressEnd-CompressPointer) is 326 greater than 4 kB, the function pmS2DCheck4KB is called 330 with the argument CompressPointer, which still has a value of 1 MB, and the flag variable newCompressType is set equal to the heterogeneous data flag value COMP_TYPE1 since the initial 4 kB page 151 is heterogeneous data rather than a page of bytes of a single value. (The operation of function pmS2DCheck4KB is discussed in detail below.) Then, CompressType is compared 335 to newCompressType, and since they are not equal 337, CompressType still having its preliminary value of negative unity from step 320, it is determined whether CompressPointer is greater than SourcePointer 345. CompressPointer is not 347 greater than SourcePointer since CompressPointer has not been incremented yet, so CompressType is set equal to newCompressType 350, i.e., COMP_TYPE1, and 4KB is added to CompressPointer 340, so CompressPointer now has a value of 1004 kB.

Control is passed back to step 325 which again tests whether (CompressEnd-CompressPointer) is greater than or equal to 4 kB. Since (CompressEnd-CompressPointer) is greater 326 than 4 kB (it is now equal to 20 kB), the function pmS2DCheck4KB is called 330 with the argument CompressPointer (which now has a value of 1004 kB) and newCompressType is again set equal to COMP_TYPE1 since the second 4 kB page 152 is heterogeneous system context data, rather than a homogeneous block of a single value. Then, CompressType is compared to newCompressType 335, and since they are now equal 336, 4 kB is added to CompressPointer (giving it a value of 1008 kB), and control is again passed back to step 325.

(CompressEnd-CompressPointer) is 326 still greater than 4 kB (it is now equal to 16 kB), so the function pmS2DCheck4KB is called 330 with the argument CompressPointer (which has a value of 1008 kB), and compression flag variable newCompressType is set equal to COMP_4KB00 since in the third 4 kB page 153 all the bytes have a value of zero. Then, CompressType is compared to newCompressType 335 and they are now unequal 337, so it is determined whether CompressPointer is greater than SourcePointer 345. Since SourcePointer still has the value of 1 MB, CompressPointer is greater than SourcePointer 346, and the function pmS2DCompress is called 355 with the arguments CompressType, SourcePointer, and (CompressPointer-SourcePointer). The function pmS2DCompress is depicted in FIG. 7, and discussed in detail below. Briefly, in this instance the two pages 151 and 152 beginning at SourcePointer and having a length of (CompressPointer-SourcePointer), i.e., 8 kB, are heterogeneous system context data so they are written to disk without compression.

Now, SourcePointer is set equal 360 to CompressPointer (i.e., 1008 kB), CompressType is set equal 350 to newCompressType (i.e., COMP_TYPE1), 4 kB is added 340 to CompressPointer giving it a value of 1012 kB, and control is passed back to step 325 which tests whether (CompressEnd-CompressPointer) is greater than or equal to 4 kB. Since (CompressEnd-CompressPointer) is 326 still greater than 4 kB (it is now equal to 12 kB), the function pmS2DCheck4KB is called 330 with the argument CompressPointer, and newCompressType is now set equal to COMP_4KB00 since the fourth 4 kB page 154 is a homogeneous block of zeroes. Then, CompressType is compared to newCompressType 335, and they are now equal 336, so 4 kB is added to CompressPointer (giving it a value of 1016 kB), and control is again passed back to step 325.

(CompressEnd-CompressPointer) is 326 still greater than 4 kB (it is now equal to 8 kB), so the function pmS2DCheck4KB is called 330 with the argument CompressPointer having a value of 1016 kB, and newCompressType is set equal to COMP_4KBFF since the fifth 4 kB page 155 is a homogeneous block of 0xFF's. Then, CompressType is compared to newCompressType 335, and they are now unequal 337, so it is determined whether CompressPointer is greater than SourcePointer 345. Since SourcePointer still has the value of 1008 kB, CompressPointer is 346 greater than SourcePointer, and the function pmS2DCompress is called 355 with the arguments CompressType, SourcePointer, and (CompressPointer-SourcePointer). Briefly, in this instance the two pages 153 and 154 beginning at SourcePointer and having a length of (CompressPointer-SourcePointer), i.e., 8 kB, are homogeneous pages of zeroes so they are written to disk with compression.

Then, SourcePointer is set equal to CompressPointer (i.e., 1016 kB) 360, CompressType is set equal to newCompressType (i.e., COMP_4KB00) 350, 4 kB is added to CompressPointer giving it a value of 1020 kB, and control is passed back to step 325 which tests whether (CompressEnd-CompressPointer) is greater than or equal to 4 kB. Since (CompressEnd-CompressPointer) is 326 now equal to 4 kB, the function pmS2DCheck4KB is again called 330 with the argument CompressPointer, and newCompressType is set equal to COMP_4KBFF since the sixth 4 kB page 156 is a homogeneous block of 0xFF's. Then, CompressType is compared to newCompressType 335, and they are now equal 336, so 4 kB is added to CompressPointer (giving it a value of 1024 kB), and control is again passed back to step 325.

Now (CompressEnd-CompressPointer) is not 326 greater than 4 kB, so it is determined whether CompressPointer is equal to CompressEnd, and since it is 367 the end of the system context memory block 135 has been reached, and the function pmS2DCompress is called 370 with the arguments CompressType, SourcePointer, and (CompressPointer-SourcePointer). In this instance the two pages 155 and 156 beginning at SourcePointer and having a length of (CompressPointer-SourcePointer), i.e., 8 kB, are homogeneous pages of 0xFF's, so they are written to disk with compression, and the function pmS2DSaveBlock is exited 375.

As illustrated by FIG. 1B and the discussion above, the present invention takes advantage of the fact that homogeneous and heterogeneous regions are likely to have lengths which are multiples of the memory management unit (MMU) page length, by evaluating regions of this length to determine if they contain bytes of a single value. It should be noted that although the present discussion is based on the MMU page length of 80386, 80486 and Pentium processors (i.e., 4 kilobytes), the present discussion easily adaptable to other processors which have pages of other lengths. For instance, in Motorola systems the page size is configurable between 256 bytes and 32 kilobytes. It should further be noted that evaluating regions which are integer multiples of the MMU page length, e.g., pages of length 8 kilobytes (for 80386, 80486 and Pentium processors), may also prove beneficial.

Figure 4:
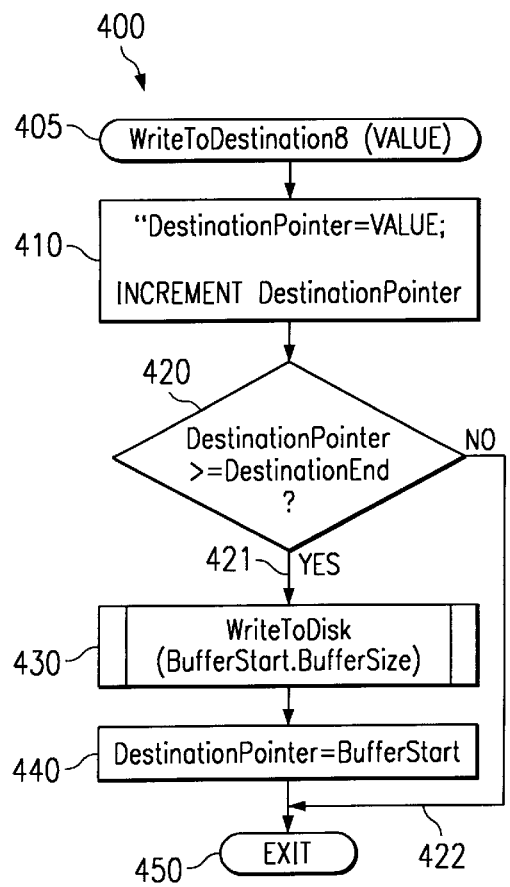
FIG. 4 shows a flowchart for WriteToDestination8, a function which writes 8-bits to the buffer, and transfers the contents of the buffer to disk via the WriteToDisk function if the buffer is full.

FIG. 4 shows the flowchart 400 for the function WriteToDestination8, which writes the 8 bits (i.e., one byte) argument, Value, to the buffer 120, and if necessary (i.e., if this fills the buffer 120) calls the function WriteToDisk to write the contents of the buffer 120 to disk. Initially, Value is written to the address pointed to by DestinationPointer, and DestinationPointer is incremented by unity 410. It is then determined 420 whether DestinationPointer is greater than or equal to DestinationEnd, the address of the end of the buffer 120. If so 421, then the contents of the buffer 120 are written to disk 430 by the function WriteToDisk. After the buffer 120 is written to disk, DestinationPointer is given the value of BufferStart, i.e., the address of the beginning of the buffer 120, and the function is exited 450. However, if DestinationPointer is not greater than or equal to DestinationEnd 422, then more data can be put in the buffer 120 before a write to disk is required, so the function WriteToDestination8 is exited 450.

Figure 5:
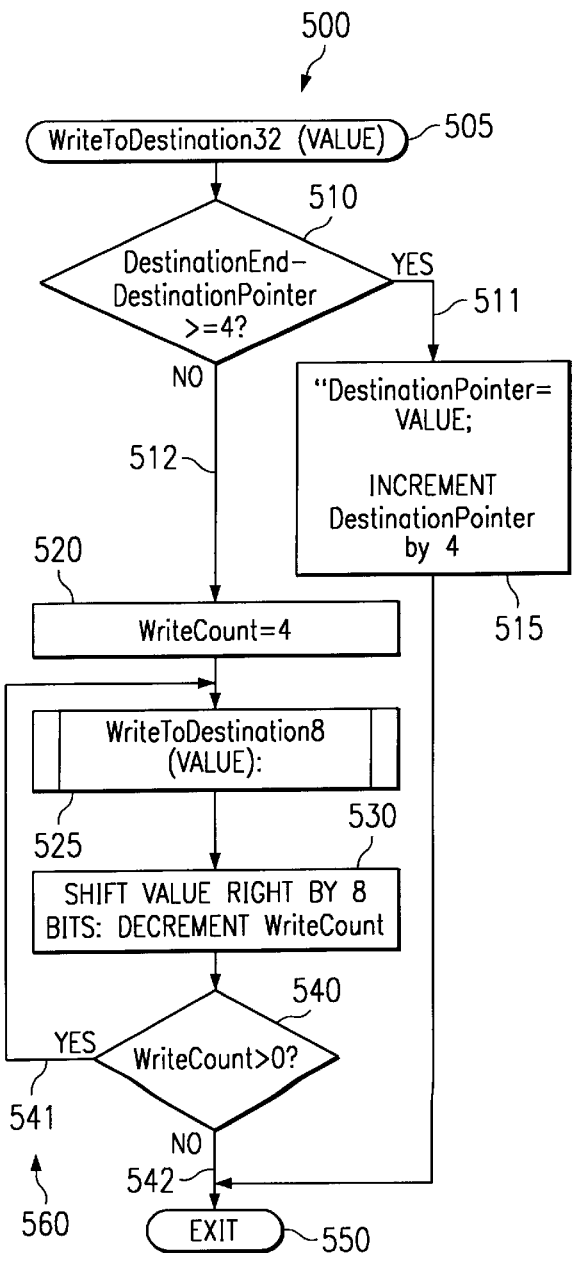
FIG. 5 shows a flowchart for WriteToDestination32, a function which writes 32-bits to the buffer.

FIG. 5 shows the flowchart 500 for the function WriteToDestination32, which writes the 32 bit (i.e., four byte) argument, Value, to the buffer 120. Initially, it is determined 510 whether the difference (DestinationEnd-DestinationPointer) is greater than or equal to four. If so 515, then more data can be put in the buffer 120 before a write to disk is required, so DestinationPointer is given the address of Value and incremented by four 515 and the function WriteToDestination32 is exited 550. However, if the difference (DestinationEnd-DestinationPointer) is not greater than or equal to four 512, then the function WriteToDestination8 must be called four times via loop 560 (consisting of steps 525, 530 and 540), because part way through the transfer of the four bytes of Value to the buffer 120 the buffer 120 will become full. WriteCount is initialized with a value of four 520, and then the function WriteToDestination8 is called 525 with the argument Value (because Value has a length of 32 bits, only the rightmost 8 bits are written to the buffer 120 by the function WriteToDestination8). The variable Value is shifted right 530 by eight bits and WriteCount is decremented 530, and then the current value of WriteCount is determined 540. If WriteCount is greater than zero 541, then the loop 560 is repeated since further eight-bit portions of Value must be written to the buffer 120. When WriteCount reaches the value zero 542, then the function WriteToDestination32 is exited 550.

Figure 6:
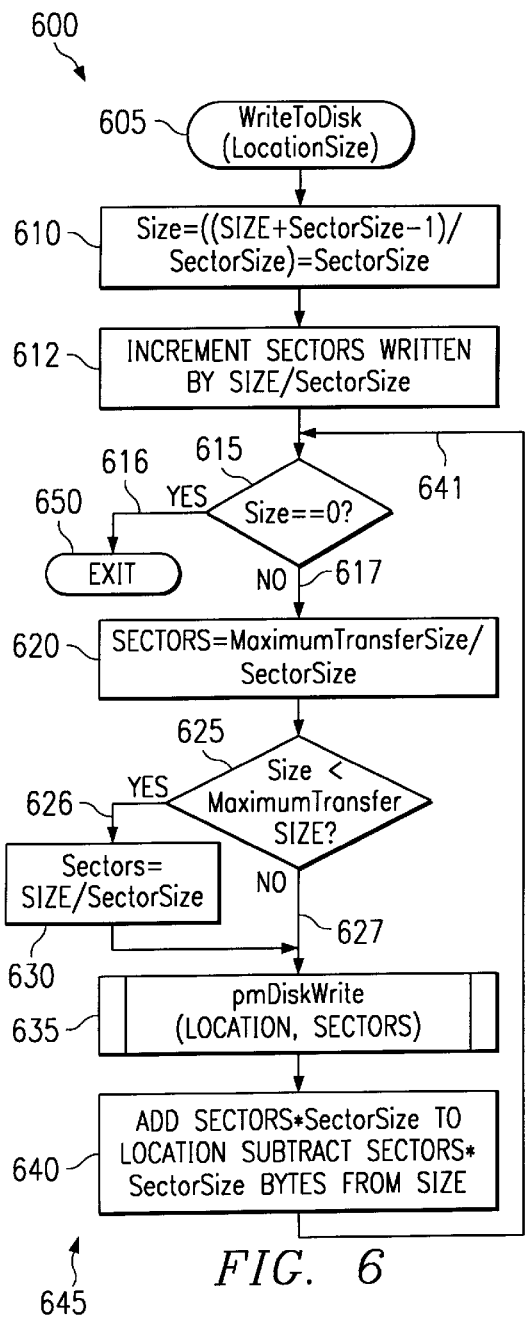
FIG. 6 shows a flowchart for WriteToDisk, a function which transfers data from the buffer to the hard disk.

FIG. 6 shows the flowchart 600 for the function WriteToDisk, which writes to disk the contents of the buffer 120. The arguments of WriteToDisk are Location, the address of the beginning of the buffer 120, and Size, the size of the data in the buffer 120 that is to be written to disk. As can be seen from step 430 of FIG. 4, WriteToDisk is given the arguments BufferStart and BufferSize when the buffer 120 is full and a write to disk is required. Similarly, as can be seen from step 270 of FIG. 2, WriteToDisk is given the arguments BufferStart and the difference (DestinationPointer-BufferStart) when the final write to disk is required and the buffer is full only up to DestinationPointer. As shown in flowchart 600 of FIG. 6, the variable Size is initially set equal to the number of sectors over which the buffer data extends, rounded up to the next largest integer number of sectors, multiplied by the number of bytes per sector 610, and SectorsWritten is incremented by Size/SectorSize. Typically, sectors are 512 bytes in length, so SectorSize is equal to 512. Then, it is determined whether Size is equal to zero 615, and if it is 616 there is no data to be written to disk, so the function is exited 650. However, if Size is not equal to zero 617, then the variable Sectors, which is used as a counting variable for the number of required data transfers, is set equal to (MaximumTransferSize/SectorSize) 620, where MaximumTransferSize is the maximum number of bytes that can be written to disk in a single write-to-disk transfer. Typically, MaximumTransferSize is 64 kB, i.e., 128 sectors. Then, it is determined whether Size is less than MaximumTransferSize 625. If it is not 627, then a disk write of the full maximum transfer size is performed by pmDiskWrite, a function which is provided in the core power management code and well-known in the art thereof. The function pmDiskWrite is given the arguments Location, the location of the beginning of the buffer data to be transferred, and Sectors, the number of sectors to be transferred. However, if Size is less than MaximumTransferSize 626, then a disk write of less than the maximum transfer size must be performed by pmDiskWrite, so Sectors is set equal 630 to Size/SectorSize before a write to disk is performed by pmDiskWrite 635. Then 640, (Sectors*SectorSize) is subtracted from Size so that Size represents the quantity of data which remains in the buffer 120 to be written to disk, and Location is incremented by (Sectors*SectorSize) so that Location represents the beginning address of the data remaining in the buffer 120 to be written to disk. Control is then passed back 641 to the step of determining whether the Size is equal to zero 615, and if not 617 another pass through loop 645 (consisting of steps 615, 620, 625, 630, 635 and 640) is performed. However, when Size is equal to zero 616, then all the data in the buffer 120 has be written to disk, and the function WriteToDisk is exited 650.

FIG. 7 shows the flowchart 700 for the function pmS2DCompress. As discussed above, the function pmS2DCompress is called as step 355 or step 370 of FIG. 3 when the number of consecutive pages of one type is determined. The arguments with which pmS2DCompress is called from FIG. 3 are CompressType, SourcePointer, and (CompressEnd-CompressPointer). In the flowchart 700 of FIG. 7 these arguments are Type, Start and Length, where Type is the type of data in the pages, Start is the address in extended memory 130 of the beginning of the pages, and Length is the length in bytes of the pages. The first step 710 of the flowchart 700 of FIG. 7 is the determination 715 of whether Type has the heterogeneous data flag value COMP_TYPE1. If it does 716, then this means that the page contains heterogeneous system context data, so Type is written 718 to the buffer 120 by WriteToDestination8, Length is written 720 to the buffer 120 by WriteToDestination32, and the data is written to the buffer 120 by CompressBlock 725, where CompressBlock may be any compression function provided with the BIOS of the computer, and the function pmS2DCompress is exited 745. However, if Type does not 717 have the value COMP_TYPE1, then it is determined 730 whether Type has one of the flag values COMP_4KB00, COMP_4KBFF or COMP_4KB. If it does 731, then this means that the page has entries of a single value, i.e., zero, 0xFF, or some value other than these two, respectively. Therefore, Type is written 740 to the buffer 120 by WriteToDestination8, and it is determined 760 whether Type has the compression flag value COMP_4KB. If it does 761, then the first byte of the block is written 765 to the buffer 120 by WriteToDestination8, Length is decremented 750 by 4 kilobytes, and the value of Length is tested 755. If Type does not 762 have the compression flag value COMP_4KB, then step 765 is skipped, Length is decremented 750 by 4 kilobytes, and the value of Length is tested 755. If Length does not have a value greater than zero 757, then all the consecutive pages of this type have been represented in the buffer 120, and the function pmS2DCompress is exited 745. However, if Length has a value greater than zero 756, then control is returned to step 740 for another pass through loop 770 (consisting of steps 740, 760, 765, 750 and 755).

FIG. 8 shows the flowchart 800 for the function pmS2DCheck4KB. As discussed above, the function pmS2DCheck4KB is called as step 330 of the pmS2DSaveBlock function of FIG. 3 with the argument CompressPointer, the address of the beginning of the page to be checked for type, to determine the type of data in the page. In FIG. 8 the argument is termed CheckPointer. The first step 810 of FIG. 8 is the initialization of CheckCount to a value of 4 kB. Then, it is determined 815 whether the byte at CheckPointer has the same value as the next byte, i.e., the byte at (CheckPointer+1), and if not 817 this means that this is not a page of bytes of a single value, and the heterogeneous data flag value of COMP_TYPE1 is returned 830, and pmS2DCheck4KB is exited 860. However, if the byte at CheckPointer does 816 have the same value as the byte at (CheckPointer+1), then it is determined whether the word (i.e., the two bytes) beginning at CheckPointer has the same value as the next word, i.e., the word at (CheckPointer+2), and if not 817 this means that this is not a page of bytes of a single value, and the heterogeneous data flag value of COMP_TYPE1 is returned 830, and pmS2DCheck4KB is exited 860. However, if the word at CheckPointer does 821 have the same value as the next word, this means that the first double word ("dword") consists of four bytes of the same value. Then 825, it is determined whether the entire 4 kB page beginning at CheckPointer has the same value as the initial dword. If not 827 this means that this is not a page of bytes of the same value, and the heterogeneous data flag value of COMP_TYPE1 is returned 830, and pmS2DCheck4KB is exited 860. However, if the entire 4 kB page beginning at CheckPointer does 826 have the same value as the initial dword, then it is determined 835 whether the byte at CheckPointer has a value of zero. If so 836, then a compression flag value of COMP_4KB00 is returned 840, and pmS2DCheck4KB is exited 860. If the byte at CheckPointer does not 837 have a value of zero, it is determined 845 whether the byte at CheckPointer has a value of 0xFF. If so 846, then a compression flag value of COMP_4KBFF is returned 850, and pmS2DCheck4KB is exited 860. If the byte at CheckPointer does not 847 have a value of 0xFF, then a general-value compression flag of COMP_4KB is returned 855, and pmS2DCheck4KB is exited 860.

Figure 9:
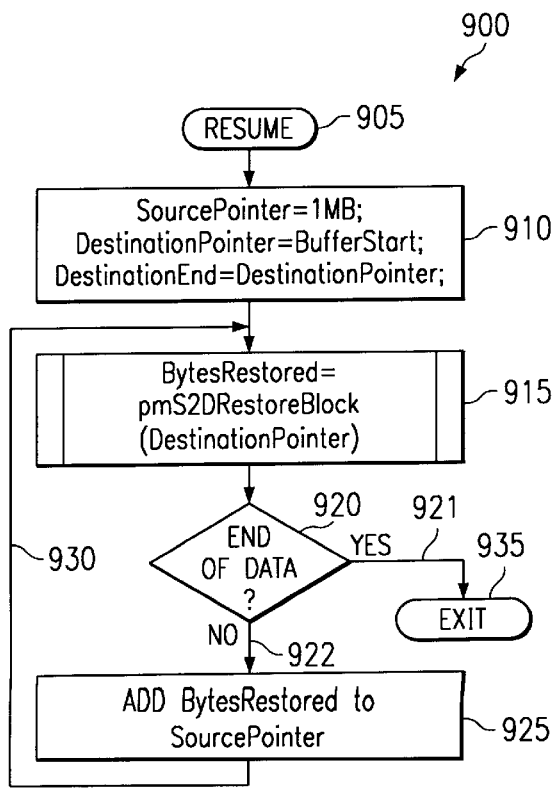
FIG. 9 shows a flowchart of the process of restoring the data, which was saved to the hard disk during the zero-volt suspend process, to RAM.

On transition from the zero-volt suspend state to a higher functionality state (i.e., states S0 through S3), the data which had been stored to the hard disk on transition to the S4 zero-volt suspend state must be transferred back to RAM. This transfer of data is in many ways similar to the transfer to non-volatile memory described above since it essentially reverses the suspend process. As shown in the flowchart 900 for the resume process of FIG. 9, the process begins 910 with the initialization of SourcePointer with a value of IMB, the initialization of DestinationPointer with the value of BufferStart, and the initialization of DestinationEnd with the value of DestinationPointer. As was the case with the suspend process, the "destination" variables refer to addresses in the buffer 120, i.e., Destination Pointer is the address of the beginning of the buffer 120 and DestinationEnd is the address of the current end boundary of the data transferred to the buffer 120, and SourcePointer is the address of the current end boundary of the data restored to the 1 MB+ extended memory region 130.

Then a call is made 915 to the function pmS2DRestoreBlock with the argument DestinationPointer, and BytesRestored is set equal to the return value of pmS2DRestoreBlock, which is the number of bytes restored by the call to pmS2DRestoreBlock. As discussed in detail in the next paragraph, pmS2DRestoreBlock's primary function is to transfer the data from the buffer 120 to the 1 MB+ extended memory region 130. Then it is determined 920 if the end of the suspend-save data in the non-volatile memory has been reached by checking the value of an end-of-data flag which is controlled in the pmS2DRestoreBlock function. If the end of the data has been reached, the end-of-data flag has been set 921 and the resume process is exited 935. If the end of the data has not been reached 922, then BytesRestored is added 925 to SourcePointer to update SourcePointer to the address of the current end boundary of the restored data in the 1 MB+ region 130, and control is returned to step 915 to begin another loop 930 (consisting of steps 915, 920 and 925).

Figure 10:
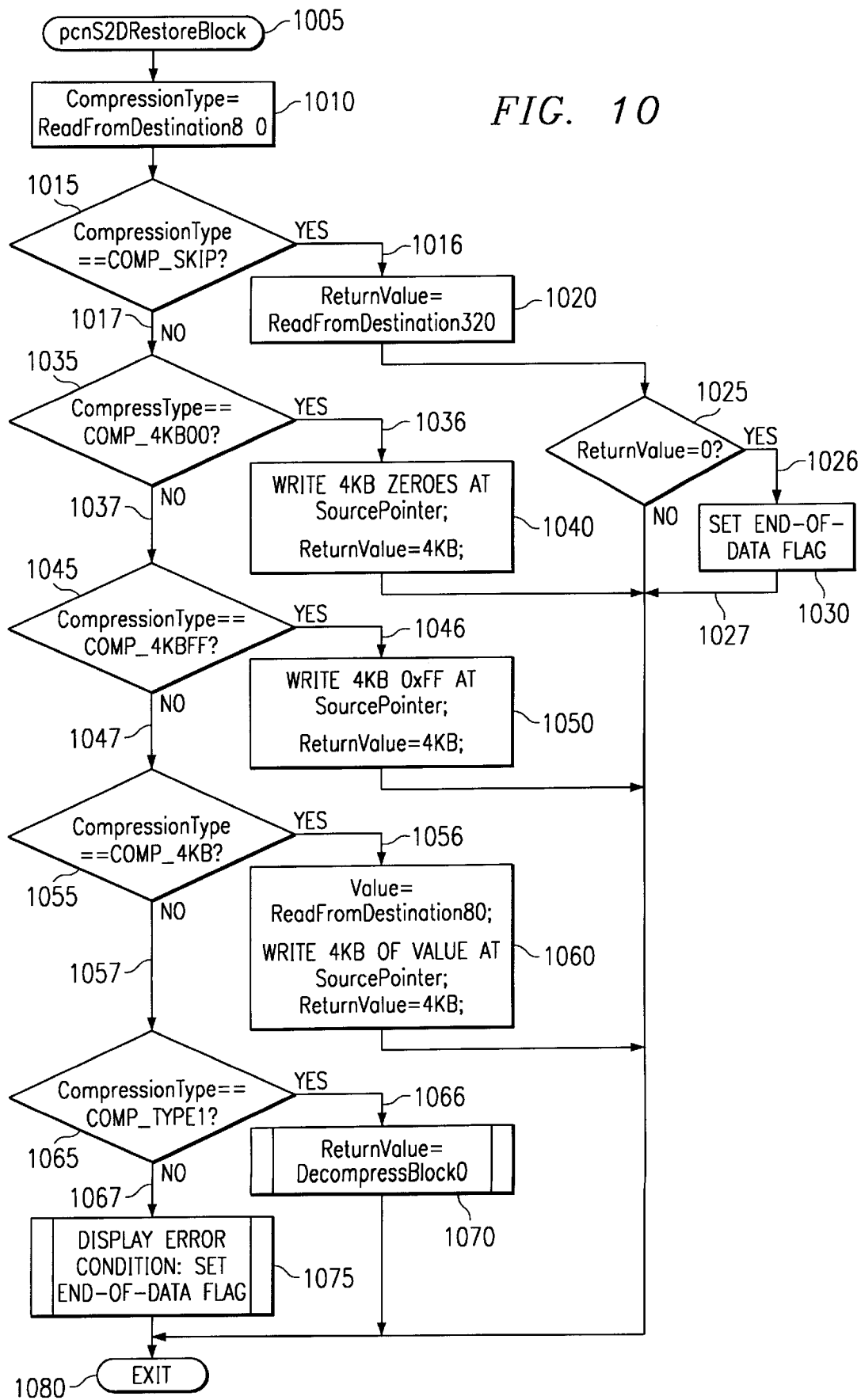
FIG. 10 shows a flowchart for pmS2DRestoreBlock, a function which decompresses a page that had been compressed in the zero-volt suspend process and writes it to extended memory.

FIG. 10 shows the flowchart 1000 for the function pmS2DRestoreBlock. The process of function pmS2DRestoreBlock begins 1010 by setting the variable CompressType equal to the return value of the ReadFromDestination8 function. The ReadFromDestination8 function is described in more detail below. Briefly, ReadFromDestination8 reads a byte from a current location in the buffer 120 and returns the value of the byte which was read. Then it is determined 1015 whether CompressionType is equal to COMP_SKIP. If CompressionType has the compression flag value of the memory hole flag COMP_SKIP 1016, then either a memory hole 131–133 has been reached, as per step 315 of the flowchart 300 of FIG. 3 for the pmS2DSaveBlock function, in which case compression flag COMP_SKIP is followed by a four byte value of the length of the memory hole 131–133; or the end of the suspend-save data 130 has been reached, as per step 270 of the flowchart 200 of FIG. 2 for the suspend process, in which case COMP_SKIP is followed by a zero. The variable ReturnValue is then set equal 1020 to the return value of the ReadFromDestination32 function, and ReturnValue is tested 1025 to determine if it is equal to zero. If it is 1026, then the end of the suspend-save data has been reached, the end-of-data flag is set 1030, and pmS2DRestoreBlock is exited 1080. However, if ReturnValue is not equal 1027 to zero, then a memory hole 131–133 has been reached, so the function pmS2DRestoreBlock is exited 1080 directly (and as can be seen from the resume process flowchart 900 of FIG. 9, SourcePointer is incremented by the return value, i.e., the length of the memory hole 131–133).

If CompressionType is not equal 1017 to COMP_SKIP, then a heterogeneous data page or a single-value page has been reached. So it is then determined if a page of zeroes has been reached by testing 1035 if CompressType has the compression flag value of COMP_4KB00, and if it is then 4 kilobytes of zeroes are written at the address SourcePointer in the 1 MB+ extended memory region 130 and ReturnValue is set equal to 4 kB 1040, and pmS2DRestoreBlock is exited 1080. However, if CompressionType is not equal 1037 to COMP_4KB00, then it is then determined if a page of 0xFF's has been reached by testing 1045 if CompressType is equal to COMP_4KBFF, and if it is 1046 then 4 kilobytes of 0xFF's are written at the address SourcePointer in the 1MB+ extended memory region 130 and ReturnValue is set equal to 4 kB 1050, and pmS2DRestoreBlock is exited 1080. However, if CompressionType is not equal 1047 to COMP_4KBFF, then it is then determined if a single-value page for bytes of any value has been reached by testing 1055 if CompressType has the general-value compression flag value of COMP_4KB. If CompressType is equal 1056 to COMP_4KB, then the variable Value is set equal to the return value of ReadFromDestination8, 4 kilobytes of the variable Value are written in the 1 MB+ extended memory region beginning at address SourcePointer, and ReturnValue is set equal to 4 kB 1060, and then pmS2DRestoreBlock is exited 1080. However, if CompressType is not equal 1057 to COMP_4KB, then it is determined whether the page is a heterogeneous page by testing 1065 if CompressionType is equal to COMP_TYPE1. If so 1066, then the page is decompressed by DecompressBlock, where DecompressBlock may be any compression function installed with the BIOS of the computer, and where the return value, ReturnValue, of DecompressBlock is equal to the length of the decompressed data, and the function pmS2DRestoreBlock is exited 1080. However, if CompressType is not equal 1067 to COMP_TYPE1, then an error has occurred because the data must have been assigned one of the types, COMP_TYPE1, COMP_4KB00, COMP_4KBFF or COMP_4KB, by pmS2DCheck4KB as per the flowchart 800 of FIG. 8. Because an error has occurred, the end-of-data flag is set 1075, the function pmS2DRestoreBlock is exited 1080, the error condition is displayed on the screen if the screen is available, and the system is rebooted without restoring the suspend-saved data from disk to RAM.

Figure 11:
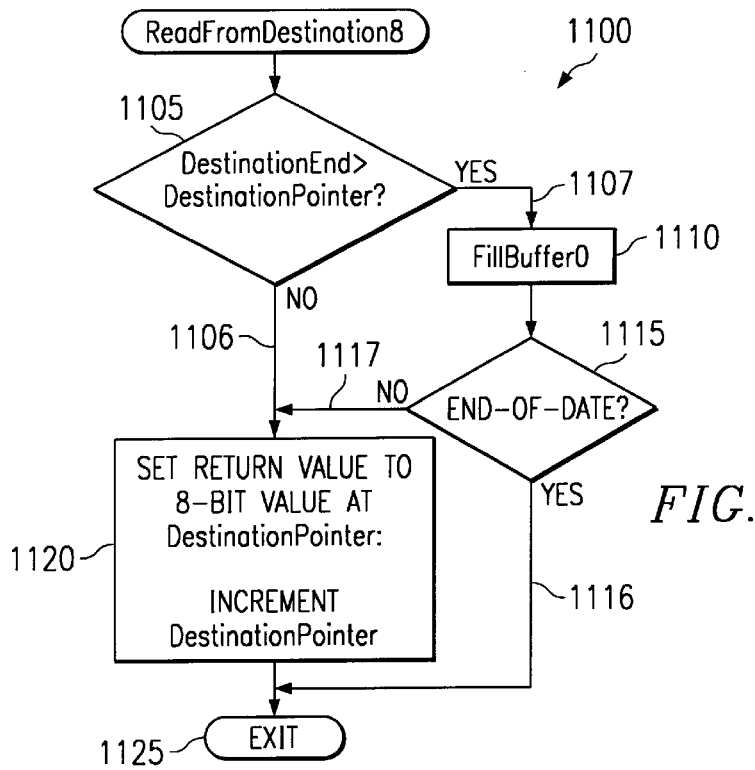
FIG. 11 shows a flowchart for ReadFromDestination8, a function which transfers a byte of data from the hard disk to the buffer.

The ReadFromDestination8 function, which reads a byte of data from the buffer 120 to the extended memory 130 is shown in the flowchart 1100 of FIG. 11. As can be seen from the flowchart 1100, the function begins with a determination 1105 of whether DestinationEnd is greater than DestinationPointer, and if it is not 1106 then the data currently in the buffer 120 has not all been transferred to the 1 MB+ extended memory 130, so the return value of the function ReadFromDestination8 is set equal to the value of the data in the buffer 120 at the address DestinationPointer and DestinationPointer is incremented by 1120, and the function is exited 1125. However, if DestinationEnd is greater 1107 than DestinationPointer, then the data currently in the buffer 120 has all been transferred to the 1 MB+ extended memory 130, so the buffer 120 is refilled with data from disk via the function FillBuffer 1110, and the value of the end-of-data flag is checked 1115. If the end of the suspend-saved data has been reached 1116, then the function ReadFromDestination8 is exited 1125. However, if the end of the suspend-saved data has not been reached 1117, then control is returned to step 1120 since another byte of data is to be read.

Figure 12:
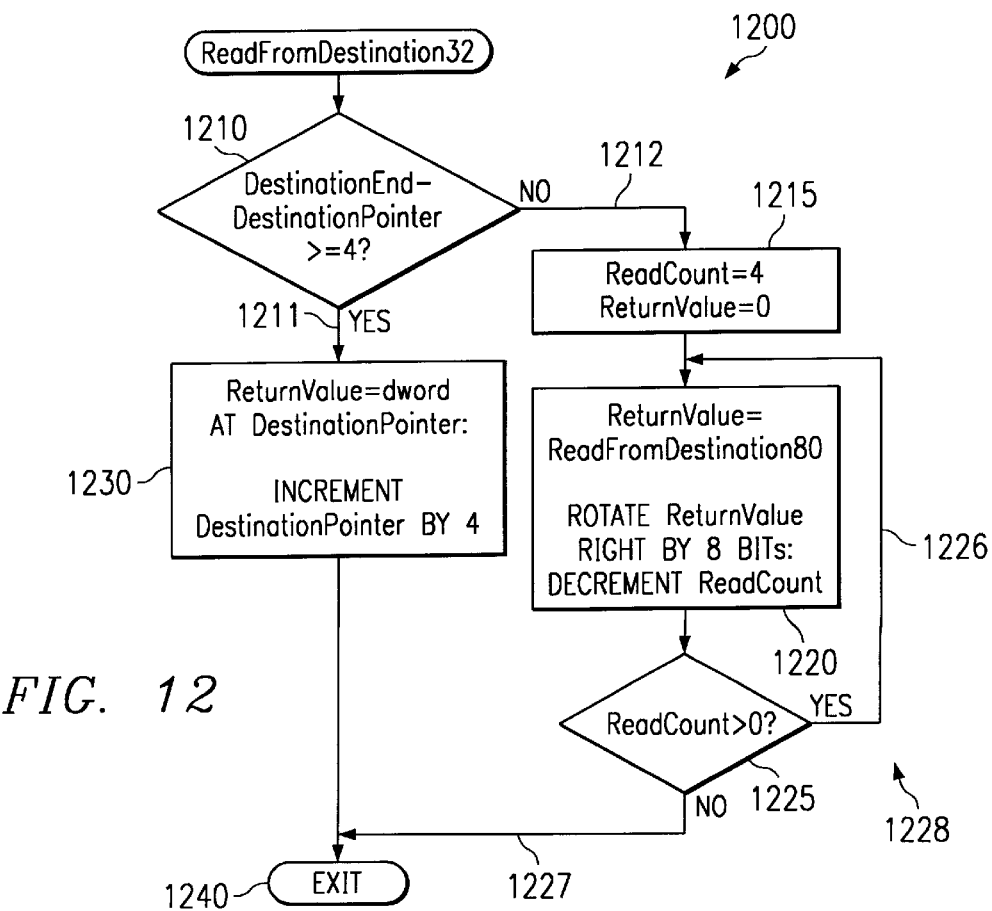
FIG. 12 shows a flowchart for ReadFromDestination32, a function which transfers four bytes of data from the hard disk to the buffer.

The ReadFromDestination32 function, which reads four bytes of data is shown in the flowchart 1200 of FIG. 12. As can be seen from the flowchart 1200, the function begins with a determination 1210 of whether the difference (DestinationEnd-DestinationPointer) is greater than or equal to four. If it is not 1212, then there is not room to transfer four bytes to the buffer 120 without reaching the end of the buffer 120, so four separate calls to ReadFromDestination8 must be made, since each call to ReadFromDestination8 tests whether the end of the buffer 120 has been reached, and if it has been reached then the buffer 120 is refilled. First 1215, the counting variable ReadCount is initialized with a value of four, and ReturnValue is initialized to zero. Then 1220, ReadCount is decremented, ReadFromDestination8 is called and ReturnValue is set equal to its return value, and ReadValue is rotated right. Since ReturnValue is a double word, i.e., a four-byte variable, while ReadFromDestination8 only returns a single byte value, each ReadFromDestination8 sets the value of the most-significant bits of ReturnValue. Then it is tested 1225 whether ReadCount has a value greater than zero, and if so 1226 then another pass through the loop 1228 (consisting of steps 1220 and 1225) is made. However, if ReadCount does not have a value greater than zero 1227, then four bytes have been read by ReadFromDestination32, and the function is exited 1240. However, if in step 1210 it is determined that the difference (DestinationEnd-DestinationPointer) is greater than or equal to four 1211, then there is room to transfer four bytes without reaching the end of the buffer 120, so ReturnValue is set equal to the double word at DestinationPointer, and DestinationPointer is incremented by four 1230, and the function ReadFromDestination32 is exited 1240.

Figure 13:
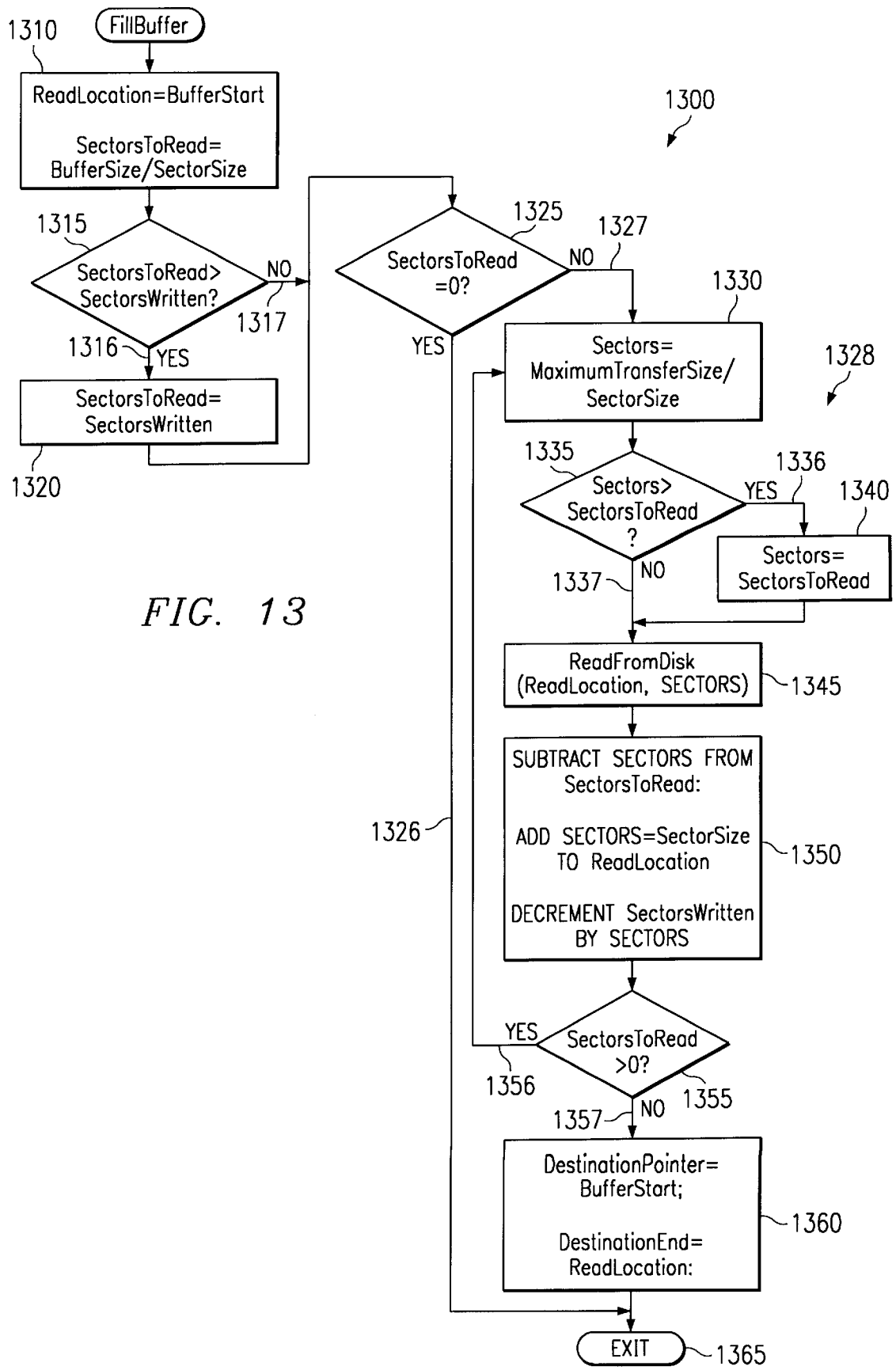
FIG. 13 shows a flowchart for FillBuffer, a function which fills the buffer with data stored on the hard disk.

A flowchart 1300 for the function FillBuffer is shown in FIG. 13. As discussed above, FillBuffer is called from step 1110 of flowchart 1100 for the ReadFromDestination8 function when the end of the buffer 120 has been reached by DestinationPointer. As can be seen from the flowchart 1300, the first step 1310 is to set ReadLocation equal to BufferStart, and SectorsToRead equal to the ratio (Buffersize/SectorSize). Then 1315, it is determined whether SectorsToRead is greater than SectorsWritten. If this is the case 1316, then the number of sectors remaining to be read is less than the size of the buffer, so SectorsToRead is set equal to SectorsWritten—otherwise 1317 SectorsToRead is not modified. Then, it is determined whether SectorsToRead is equal to zero 1325, and if it is 1326 then all the sectors which were required to be transferred to the buffer 120 have been transferred, and FillBuffer is exited 1365.

However, if SectorsToRead is not equal 1327 to zero then sectors remain to be transferred to the buffer 120, and loop 1328 (consisting of steps 1330, 1335, 1340, 1345, 1350 and 1355) is begun. First 1330, the variable Sectors is set equal to the ratio (MaximumTransferSize/SectorSize), so that Sectors is equal to the maximum number of sectors that can be transferred in one read-from-disk operation. Then 1335, it is determined whether Sectors is greater than SectorsToRead. If this is the case 1336, then Sectors is set equal to SectorsToRead, and ReadFromDisk is called 1345 to transfer Sectors number of sectors of data to ReadLocation of the buffer 120. However, if Sectors is not greater than SectorsToRead 1337, again a transfer of the maximum possible number of sectors is to be made by a call to ReadFromDisk 1345. Then 1350, Sectors is subtracted from SectorsToRead, Sectors is subtracted from SectorsWritten, and ReadLocation is incremented by Sectors*SectorSize, and it is tested 1355 whether SectorsToRead is greater than zero. If it is 1356, then additional sectors remain to be transferred to the buffer 120, and another pass through loop 1328 is performed. Otherwise 1357, DestinationPointer is set equal to BufferStart and DestinationEnd is set equal to ReadLocation 1360, and FillBuffer is exited 1365.

Although the above description contains specific examples, these should not be construed as limiting the scope of the invention, but as merely providing illustrations of some of the preferred embodiments of this invention. Many variations are possible and are to be considered within the scope of the present invention. For instance: the compression method may be applied to types of data other than configuration data; the compression method may be used for data transfers other than transfers from RAM to hard disk for a zero-volt suspend; the computer system need not have more than one state of higher functionality than the zero-volt suspend state; the volatile memory need not be RAM; the non-volatile memory need not be a hard drive; a greater or lesser number of memory holes may be present in the 1 MB+ region of RAM; the sectors may have a size other than 512 bytes; the pages need not be 4 kilobytes in length; the pages may be multiples of 4 kilobytes in length; the data in the memory holes may also be saved during the suspend process, and restored during the resume process; the buffer region may be located elsewhere in RAM and may be of greater or lesser size; etc. Thus the scope of the invention should be determined not by the examples given herein, but rather by the appended claims and their legal equivalents.

What is claimed is:

1. A method for transferring data located as contents in a memory block having a memory block beginning address in a first memory in a computer to a non-volatile storage in the computer, comprising the steps of:

examining a first page of the memory block;

setting a flag to a first homogeneous-page value if the first page of the memory block contains bytes solely of a first byte value;

setting the flag to a heterogeneous-page value if the first page of the memory block contains bytes of multiple values;

transferring the flag to a buffer address in a buffer region in the first memory, and performing an incrementation of the buffer address, if the flag has the first homogeneous-page value;

transferring at least the contents of the first page to the buffer address in the buffer region, and performing a series of incrementations of the buffer address during the transferring, if the flag has the heterogeneous-page value; and evaluating the buffer address after each of the incrementations of the buffer address, and if the buffer address is greater than or equal to a buffer ending address, transferring the contents of the buffer to the non-volatile storage and setting the buffer address equal to a beginning buffer address.

2. The method of claim 1 further including the steps of:
   setting the flag to a second homogeneous-page value if the first page of the memory block contains bytes solely of a second byte value; and
   transferring the flag to the buffer address in the buffer region in the first memory, and performing an incrementation of the buffer address, if the flag has the second homogeneous-page value.

3. The method of claim 2 wherein the first byte value is zero and the second byte value is 0xFF.

4. The method of claim 2 further including the steps of:
   setting the flag to a third homogeneous-page value if the first page of the memory block contains bytes solely of a third byte value; and
   transferring the flag to the buffer address in the buffer region in the first memory, and performing an incrementation of the buffer address, if the flag has the third homogeneous-page value.

5. The method of claim 4 wherein the third homogeneous-page value is equal to a concatenation of a constant and the third byte value.

6. The method of claim 1 further including the step of transferring the flag to the buffer if the flag has the heterogeneous-page value.

7. The method of claim 1 further including the steps of:
   determining a number of pages containing bytes of multiple values if the flag has the heterogeneous-page value; and
   transferring the number to the buffer address in the buffer region in the first memory, and performing an incrementation of the buffer address, if the flag has the heterogeneous-page value.

8. The method of claim 1 wherein the memory block in the first computer memory is followed by a memory hole having a memory hole length, further including the steps of:
   transferring a memory-hole flag to the buffer address in the buffer region in the first memory, and performing an incrementation of the buffer address; and
   transferring the memory hole length to the buffer address in the buffer region in the first computer memory, and performing an incrementation of the buffer address.

9. The method of claim 1 wherein, if the flag has the heterogeneous-page value, the contents of each page containing bytes of multiple values is compressed and transferred to the buffer address in the buffer region.

10. The method of claim 1 wherein the first memory is a volatile memory, the data is system context data, and the transferring of the data is made in order to transition to a zero-volt suspend state.

11. The method of claim 1 wherein the method further includes the step of clearing the buffer region in the first memory prior to storage of any data in the buffer region.

12. The method of claim 11 wherein the step of clearing the buffer region includes storage of contents of the buffer region in the non-volatile storage.

13. The method of claim 1 wherein the integer is equal to one or two.

14. The method of claim 1 wherein the first page has a length equal to a memory management unit page size multiplied by an integer greater than or equal to one.

15. The method of claim 14 wherein the data page has a length of 4 kilobytes.

16. A utility for transferring data located as contents in a memory block in a first memory in a computer to a non-volatile storage in the computer, the memory block having a beginning address and a first page, the utility comprising:
   means for setting a flag to a first homogeneous-page value if the first page of the memory block contains bytes solely of a first byte value, or for setting the flag to a heterogeneous-page value if the first page of the memory block contains bytes of multiple values;
   means for transferring the flag to a buffer address in a buffer region in the first memory and incrementing the buffer address, if the flag has the first homogeneous-page value, or for transferring at least the contents of the first page to the buffer address in the buffer region and serially incrementing the buffer address during the transfer, if the flag has the heterogeneous-page value; and means for evaluating the buffer address after each of the incrementations of the buffer address and, if the buffer address is greater than or equal to a buffer ending address, transferring the contents of the buffer to the non-volatile storage and setting the buffer address equal to a beginning buffer address.

17. The utility of claim 16 wherein the setting means includes setting the flag to a second homogeneous-page value if the first page of the memory block contains bytes solely of a second byte value; and the transferring means includes transferring the flag to the buffer address in the buffer region in the first memory and incrementing the buffer address, if the flag has the second homogeneous-page value.

18. The utility of claim 17 wherein the setting means further includes setting the flag to a third homogeneous-page value if the first page of the memory block contains bytes solely of a third byte value; and the transferring means further includes transferring the flag to the buffer address in the buffer region in the first memory and incrementing the buffer address, if the flag has the third homogeneous-page value.

19. The utility of claim 16 wherein the transferring means the flag to the buffer if the flag has the heterogeneous-page value.

20. The utility of claim 16 wherein the utility includes means for determining a number of pages containing bytes of multiple values if the flag has the heterogeneous-page value; and the transferring means includes transferring the number to the buffer address in the buffer region in the first computer memory and incrementing the buffer address, if the flag has the heterogeneous-page value.

21. The utility of claim 16 wherein the memory block is followed by a memory hole having a memory hole length;
    the setting means includes setting the flag to a memory hole value; and
    the transferring means includes transferring the memory-hole flag and the memory hole length to the buffer address in the buffer region in the first memory and incrementing the buffer address.

22. The utility of claim 16 wherein, if the flag has the heterogeneous-page value, the transferring means includes compressing and transferring the contents of each page containing bytes of multiple values to the buffer address in the buffer region.

23. The method of claim 16 wherein the memory block is a volatile memory, the data is system context data, and the transferring of the data is made in order to transition to a zero-volt suspend state.

24. The utility of claim 16 wherein the buffer region in memory block is cleared prior to storage of any data in the buffer region by storing the contents of the buffer region in the non-volatile storage.

25. The utility of claim 16 wherein the integer is equal to one or two.

26. The utility of claim 16 wherein the first page has a length equal to a memory management unit page size multiplied by an integer greater than or equal to one.

27. In a computer system with an operating system and/or BIOS, the operating system having predefined devices including a memory block having a beginning address and a first page in a first memory in the computer system and a non-volatile storage in the computer system, the system comprising a device for transferring data located as contents in the memory block to a non-volatile storage, the device configured to:

set a flag to a first homogeneous-page value if the first page of the memory block contains bytes solely of a first byte value, or set the flag to a heterogeneous-page value if the first page of the memory block contains bytes of multiple values;

transfer the flag to a buffer address in a buffer region in the first memory and increment the buffer address, if the flag has the first homogeneous-page value, or transfer at least the contents of the first page to the buffer address in the buffer region and serially increment the buffer address during the transfer, if the flag has the heterogeneous-page value; and evaluate the buffer address after each of the incrementations of the buffer address and, if the buffer address is greater than or equal to a buffer ending address, transfer the contents of the buffer to the non-volatile storage and set the buffer address equal to a beginning buffer address.

28. The system of claim 27 wherein the device is further configured to set the flag to a second homogeneous-page value if the first page of the memory block contains bytes solely of a second byte value or to a third homogeneous-page value if the first page of the memory block contains bytes solely of a third byte value and to transfer the flag to the buffer address in the buffer region in the first memory and increment the buffer address, if the flag has the second homogeneous-page value or third homogeneous-page value.

29. The system of claim 27 wherein the device is configured to determine a number of pages containing bytes of multiple values if the flag has the heterogeneous-page value and to transfer the number to the buffer address in the buffer region in the first memory and to increment the buffer address, if the flag has the heterogeneous-page value.

30. The system of claim 27 wherein the memory block is followed by a memory hole having a memory hole length and the device is further configured to set the flag to a memory hole value and to transfer the memory-hole flag and the memory hole length to the buffer address in the buffer region in the first memory and to increment the buffer address.

31. The system of claim 27 wherein the device is further configured to, if the flag has the heterogeneous-page value, compress and transfer the contents of each page containing bytes of multiple values to the buffer address in the buffer region.

32. A computer-readable storage device having a utility for transferring data located as contents in a memory block in a first memory in a computer to a non-volatile storage in the computer, the memory block having a beginning address and a first page, the utility comprising:

means for setting a flag to a first homogeneous-page value if the first page of the memory block contains bytes solely of a first byte value, or for setting the flag to a heterogeneous-page value if the first page of the memory block contains bytes of multiple values;

means for transferring the flag to a buffer address in a buffer region in the first memory and incrementing the buffer address, if the flag has the first homogeneous-page value, or for transferring at least the contents of the first page to the buffer address in the buffer region and serially incrementing the buffer address during the transfer, if the flag has the heterogeneous-page value; and means for evaluating the buffer address after each of the incrementations of the buffer address and, if the buffer address is greater than or equal to a buffer ending address, transferring the contents of the buffer to the non-volatile storage and setting the buffer address equal to a beginning buffer address.

33. The storage medium of claim 32 wherein the setting means includes setting the flag to a second homogeneous-page value if the first page of the memory block contains bytes solely of a second byte value or to a third homogeneous-page value if the first page of the memory block contains bytes solely of a third byte value; and the transferring means includes transferring the flag to the buffer address in the buffer region in the first memory and incrementing the buffer address, if the flag has the second homogeneous-page value or has the third homogeneous-page value.

34. The storage medium of claim 32 wherein the utility further includes means for determining a number of pages containing bytes of multiple values if the flag has the heterogeneous-page value; and the transferring means includes transferring the number to the buffer address in the buffer region in the first memory and incrementing the buffer address, if the flag has the heterogeneous-page value.

35. The storage medium of claim 32 wherein:

the memory block is followed by a memory hole having a memory hole length;

the setting means includes setting the flag to a memory hole value; and the transferring means includes transferring the memory-hole flag and the memory hole length to the buffer address in the buffer region in the first memory and incrementing the buffer address.

36. The storage medium of claim 32 wherein, if the flag has the heterogeneous-page value, the transferring means includes compressing and transferring the contents of each page containing bytes of multiple values to the buffer address in the buffer region.

37. The storage medium of claim 32 wherein the computer readable storage medium is a memory device, a microprocessor with integrated memory, a fixed or hard disc, a compact disc, or a floppy disk.

* * * * *